United States Patent Office 3,268,339
Patented August 23, 1966

3,268,339
METHOD OF PREPARING A COMMINUTED FOOD PRODUCT
David Torr, Ripley Lane, Oyster Bay, N.Y.
No Drawing. Filed Feb. 23, 1965, Ser. No. 434,657
4 Claims. (Cl. 99—108)

This invention is a continuation-in-part of my copending patent application Serial No. 372,704, filed June 4, 1964, now United States Patent No. 3,173,795, dated March 16, 1965, and similarly relates to the preparation of poultry and animal meat products.

More specifically, the present invention relates primarily to a novel and useful poultry product comprised essentially of whole pieces of poultry meat admixed with comminuted poultry skin, poultry by-products and/or poultry meat, said product, when formed, being thermosetting of character.

Packing house animal products and packing house animal by-products may also be treated in accordance with the invention, said products including all edible animal products and by-products of an organic, non-calcareous nature, as distinguished from bones and the like which consist largely of inorganic matter. The invention also contemplates the treatment of organic, noncalcareous and calcareous packing house animal by-products generally classified as inedible but which may be converted to edible materials by the process disclosed and taught herein.

The term edible packing house animal products and organic packing house by-products, as used herein, and in the appended claims, will be understood not to include bones, hair, wool, or the like, but to respectively include all of the fleshy or meaty portions of the animal and by-products, e.g., ears, lips, snouts, the meaty portion of the head, knuckles, feet, tails, tendons, brain, muscular tissues, sinews, fats, glands, skin tissues, cheeks, tongue, cartilage, horn piths, pizzles, stomach, lungs, intestines and viscera generally.

Essentially, the invention is directed to the conversion of poultry or animal products into a mass of fibriform consistency and in the uncooked condition, whereby such fibriformed mass, when admixed interstitially with whole pieces or chunks of raw meat and pressed together by hand or other pressure means as ordinarily required to make meat patties, will, by dint of the raw fibriformed mass coacting with the raw meat pieces, hold together during subsequent cooking thereof and thereafter, notwithstanding the absence of an external casing or mold as heretofore required. The precooked product, which appears as an integral chunk of meat although actually comprised of many individual pieces of meat and the fibriformed mass serving as a matrix, retains its integrity when served cold, at room temperature, or when heated for serving, so that it can be sliced without disintegrating, crumbling or falling apart.

The entire raw product, a mixture of pieces of meat and matrix, may be marketed as an amorphous product, and may be molded by hand by the user as required, to form a roast of any desired size or shape.

Consonant with the foregoing, a general object of the invention is to provide a method for producing a turkey or chicken product in pre-cooked chunk form which is economical to produce and which will remove such an all poultry product from the luxury class.

Another object of the instant invention resides in the formation of a food product composed of a binder matrix prepared substantially of comminuted poultry or packing house animal meat of fibriform consistency admixed with any suitable pieces of meat, e.g., chicken, turkey, ham, tongue and the like either singly or in combination.

Still another object of this invention resides in the preparation of an uncooked meat product, which can be marketed in the raw amorphous state, and which can be formed into any desired shape by the user, and cooked without being stuffed into a casing, the cooked product thus formed being integral and thermoset and capable of being sliced in the manner of a one-piece roast.

Other objects and advantages of the instant invention will be set forth in part hereinafter and in part will be obvious herefrom, or may be learned by practice of the invention, the same being realized and attained by means of procedures defined and pointed out in the appended claims.

In preparing an all poultry product, the preferred embodiment of the present invention, it will be appreciated that the poultry may be obtained in eviscerated form, already cut up into parts, i.e., legs, thighs, breasts, etc., removal or not of the skin being optional. The meat is then boned out to obtain the largest pieces practicable. Ideally, it will be understood, the bird yields six pieces of boneless meat; one piece each from the leg and thigh portions and two pieces for the breast portion. The bones are then discarded and the meat set aside for subsequent use.

Raw poultry skin, normally considered a by-product in the usual processing of birds for human consumption, is readily and economically obtainable and is preferably utilized herein, for preparation of the binder matrix of the ultimately formed poultry product. Other by-products, such as giblets, when treated as disclosed herein, will similarly function in a suitable manner, although poultry skin has been found to be exceptionally applicable.

The treatment of the raw skin resides in the reduction thereof to comminuted fibriform consistency, the desirable magnitude of individual fibers being approximately 1/8" by .020 of diameter. To so convert the skin to particulate fibrous form, a standard cutter, preferably of the rotating bowl type having rotating cutter blades disposed normally to the base of the bowl is employed. Accordingly, the raw skin is placed in the cutter at a temperature of approximately 38° F., 1–5 percent of sodium chloride by weight of skin added, and as comminution commences, ice is gradually introduced to the batch until a temperature of about 59° F. is attained, at which temperature the batch is maintained until the desired fibrous condition is achieved. Based upon the quantity of product in the cutter, the duration of time required to effectuate this phase may range from between five minutes to one hour.

I have discovered that the desired binding property of the fibriformed skin is enhanced by the addition of uncooked dark meat of the leg or thigh and/or giblets during the comminuting step. The proportion of dark meat to skin is not critical and may be five percent of dark meat to the weight of skin or the amount of dark meat may even surpass the weight of skin. It will be appreciated that the dark meat so used, and especially that of older birds, is usually considered undesirable for other uses and hence its incorporation herein with the raw skin for use as a binder matrix affords a profitable use for a product which would otherwise remain an economic waste. Poultry meat alone, it will be appreciated, may be comminuted, to serve as the binder matrix.

Upon finalization of the comminuting step as hereinabove described, the fibriformed batch, consisting either of raw skin in its entirety, of raw skin, giblets and dark meat in fibrous homogeneous form, or as comminuted dark meat alone, is removed from the cutter and admixed with the pieces of boneless meat which had heretofore been set aside, 1–5 percent of salt (sodium chloride) to the weight of boneless meat being added as the admixture is prepared. Thus, the product at this phase will be understood to consist of the raw comminuted binder matrix, raw pieces of meat being interspersed substantially uniformly therewithin. Large or small amounts of meat may be utilized depending, of course, upon the type of market being sought. That is, where luxury market distribution and consumption is to be involved, the ratio of fibrous matrix to meat may be 1:4, while a converse ratio may be employed for the economy market. Intermediate ratios, of course, will be suitable for markets lying between the aforesaid extreme classes.

The uncooked amorphous mixture is now pressed together into any desired shape, the pressure source being either hand or mechanical, but need be no greater than the pressure required to form, e.g., meat patties in the conventional manner. The product, cohesively held together, is cooked in water to an internal temperature of about 160° F. to 170° F., and depending upon the diameter and size thereof, the cooking period may range from thirty minutes to approximately six hours. Cooking may, if desired, be accomplished in a dry oven or a smoking oven or by any other suitably employable method.

After the product or formed meat unit is cooked, it is cooled to a temperature between 50-70° F., and preferably 60° F., a cooling water spray, ice immersion, a holding cooler or any other suitable means being utilized for such purpose. Upon cooling, the fibrous matrix provides excellent binding for the pieces of meat interspersed throughout, permitting this finished combined product to be sliced easily at normal temperatures, refrigeration being not required to preserve the integrity of the meat unit for slicing and the slices remain firm and solid in use. The instant finished product will remain firm even upon heating and is herein referred to as being thermosetting of character. This thermosetting attribute is believed due to the cold status of the skin, other by-products and/or meat while being comminuted to form the matrix, the action of the salt, the uncooked nature of the matrix, the fibriform consistency of the matrix, and the uncooked condition of the pieces of meat interspersed throughout the matrix, this interspersed product becoming thermoset upon being cooked.

As an example of an all poultry product prepared according to the aforedescribed procedure, a preferable ingredient composition was determined to be as follows:

*Binder matrix*

4.0 pounds of raw poultry skin
.125 pound of salt

The above composition was comminuted to fibriform consistency as disclosed herein and 1 pound of ice was added during this comminution step. A Schnell cutter was utilized in accomplishing the comminution and permitted to act upon the composition for 10 minutes.

*Whole meat pieces*

16.0 pounds of raw breast and raw thigh meat
.25 pound of salt

The meat pieces and salt were mixed in a mixing bowl for 5 minutes. Next, the matrix and meat pieces were admixed into an homogeneous product. The product thus formed and amorphous in the absence of an external casing or containing member, was pressed together using hand pressure only and cooked in water as described herein. The product held together unexpectedly well and could be handled and sliced as though it were comprised of a single piece of meat. Further, slices cut therefrom remained set even at cooking temperatures thereby displaying the thermoset characteristic above described.

Similarly and in accordance with the invention as set forth in the preceding portion of this specification, packing house animal meat and by-products may be converted to an edible and useful form, economy of finished product and the utility thereof being the primary end purposes.

Thus, it will be appreciated that fleshy or meaty animal components may similarly be reduced to fibriform consistency in accordance with the foregoing and to provide an effective binder matrix. The preparation of a matrix consisting of choice animal products coupled with by-products is, of course contemplated herein, the inclusion of fibriformed meat with fibriformed by-products with salt as described, having been found to enhance the binding character of the homogeneous matrix. Here as in the case of the poultry product, the comminuted fibriformed matrix has been found exceptionally capable of uniting the whole meat pieces notwithstanding the absence of a casing, the hand-pressed precooked meat unit being also endowed with the thermosetting property.

As above stated, with respect to poultry meat, the greatest economy of product will obviously be attained where the binder filler matrix is formed of treated animal by-products. Large or small amounts of meat pieces may be dispersed or admixed with the matrix depending upon the type of market being sought. That is, where luxury market distribution and consumption is the desideratum, the ratio of fibrous matrix to whole pieces of meat may be 1:4, while converse and intermediate ratios may be employed for the economy market and for markets lying therebetween.

Further, it will be appreciated, the invention is applicable not only to poultry and the other usual food animals, but also to horses, deer, rabbits and any other animals suitable for food for human consumption, or for pet, poultry or packing house animal feeding.

The finished product, whether comprised of poultry or packing house animal products, may be marketed in either the cooked or uncooked form. Where marketed as a raw product, the user, as aforedescribed, would shape the amorphous mixture of matrix and meat pieces and upon cooking, the product which had previously been pressed together, would advance through to the thermosetting phase. Where marketed in the pre-cooked state, the product may be served cold or heated, but in either case, the slices would remain integral and thermoset and thus provide an excellent food product.

The invention in its broader aspects is not limited to the specific steps, methods and compositions described but departures may be made therefrom within the scope of the accompanying claims without departing from the principles of the invention and without sacrificing its chief advantages.

What is claimed is:

1. The method of preparing a food product comprising the steps of comminuting raw edible poultry by-products to fibriform consistency to form a fibrous binder matrix, adding 1–5% of sodium chloride by weight to the by-products being comminuted, cooling the by-products during comminution, mixing pieces of meat with said matrix to form an amorphous mixture, pressing said amorphous mixture together, cooking the pressed mixture to form an integral cohesively held together food unit, cooling said food unit to form a product which retains its integrity at normal and cooking temperatures and which is capable of being sliced into integral slices at normal and heated temperatures.

2. The method of preparing a food product comprising the steps of comminuting raw poultry parts selected from the group consisting of poultry skin, poultry giblets, poultry meat and mixtures of the foregoing to fibriform consistency to form a fibrous binder matrix, adding 1–5% of sodium chloride by weight to the matrix during the comminution thereof, cooling the matrix during comminution, mixing pieces of raw poultry meat with said matrix and adding 1–5% of sodium chloride by weight of the pieces of raw poultry meat to form an amorphous mixture, pressing said amorphous mixture together, cooking the pressed mixture to form an integral cohesively held together food unit, cooling said food unit to form a product which retains its integrity at normal and cooking temperatures and which is capable of being sliced into integral slices at normal and heated temperatures.

3. The method of preparing a food product comprising the steps of comminuting raw edible animal by-products to fibriform consistency to form a fibrous binder matrix, adding 1-5% of sodium chloride by weight to the by-products being comminuted, cooling the by-products during comminution, mixing pieces of animal meat with said matrix to form an amorphous mixture, pressing said amorphous mixture together, cooking the pressed mixture to form an integral cohesively held together food unit, cooling said food unit to form a product which retains its integrity at normal and cooking temperatures and which is capable of being sliced into integral slices at normal and heated temperatures.

4. The method of preparing a food product comprising the steps of comminuting raw animal parts selected from the group consisting of edible by-products, meat and mixtures of the foregoing to fibriform consistency to form a fibrous binder matrix, adding 1-5% of sodium chloride by weight to the matrix during comminution thereof, cooling the matrix during comminution, mixing pieces of raw meat with said matrix and adding 1-5% of sodium chloride by weight of the pieces of raw meat to form an amorphous mixture, pressing said amorphous mixture together, cooking the pressed mixture to form an integral cohesively held together food unit, cooling said food unit to form a product which retains its integrity at normal and cooking temperatures and which is capable of being sliced into integral slices at normal and heated temperatures.

References Cited by the Examiner

UNITED STATES PATENTS 3,024,113   3/1962   Torr _____ 99—107
3,173,795   3/1965   Torr _____ 99—107 X

OTHER REFERENCES

Berolzheimer: "Culinary Arts Institute Encyclopedia Cook Book," 1948, published by Culinary Arts Institute, Chicago, pp. 354 and 355.

A. LOUIS MONACELL, *Primary Examiner.*

HYMAN LORD, *Examiner.*